United States Patent [19]

Wolt

[11] 3,890,320

[45] June 17, 1975

[54] NOVEL PROCESS FOR PRODUCING 2-ACYL-3-ALKYL PYRAZINES

[75] Inventor: John Wolt, Freehold, N.J.

[73] Assignee: International Flavors & Fragrances Inc., New York, N.Y.

[22] Filed: Apr. 23, 1973

[21] Appl. No.: 353,779

[52] U.S. Cl. .............................................. 260/250 B
[51] Int. Cl. .............................................. C07c 51/76
[58] Field of Search ................................. 260/250 B

[56] References Cited
UNITED STATES PATENTS 3,711,482   1/1973   Mookherjee et al. ............ 260/250 B

*Primary Examiner*—Donald G. Daus
*Assistant Examiner*—David B. Springer
*Attorney, Agent, or Firm*—Arthur L. Liberman, Esq.; Harold Haidt, Esq.

[57] ABSTRACT

Process for producing 2-acyl-3-lower alkyl pyrazines including the steps of (1) providing a 2-lower alkyl-3-lower alkyl pyrazine or mixture of different 2-lower alkyl-3-lower alkyl pyrazines; (2) treating said pyrazine or mixture of pyrazines with a mixture of (i) an alkali metal dichromate and (ii) either acetic acid or sulfuric acid and, optionally, (3) recovering the 2-acyl-3-lower alkyl pyrazine reaction product from the reaction mass.

8 Claims, No Drawings

NOVEL PROCESS FOR PRODUCING 2-ACYL-3-ALKYL PYRAZINES

BACKGROUND OF THE INVENTION

This invention relates to a process for the preparation of 2-acyl-3-lower alkyl pyrazines for use in the flavor and fragrance industry. More specifically, the present invention relates to a process for the preparation of 2-acetyl-3-lower alkyl pyrazines and 2-propionyl-3-lower alkyl pyrazines which may or may not have additional lower alkyl substituents on the pyrazine ring in the "5" and/or "6" positions. These compounds are useful flavor additives for foodstuffs, tobacco, pet foods, they are useful masking agents for undesirable flavors in foodstuffs, and they are useful additives for perfume formulations.

2-Acetyl-3-ethyl pyrazine prepared by the process of the present invention has a strong raw or cooked potato aroma and fragrance thus providing potato or potato-like flavor and aroma qualities to foodstuffs. Other pyrazines prepared by the process of the present invention which are closely related chemically to 2-acetyl-3-ethyl pyrazine are known to have cereal and roast grain flavors, for example, 2-acetyl-3-methyl pyrazine. The flavor use of 2-acetyl-3-ethyl pyrazine is disclosed in U.S. Pat. No. 3,711,482 issued on Jan. 16, 1973. The flavor qualities of 2-acetyl-3-methyl pyrazine are disclosed in the published Dutch application Pat. No. 68/12899 published on Mar. 13, 1969. See compound 47 on Page 4 in Table I.

Heretofore, 2-acyl-3-lower alkyl pyrazines have been prepared by somewhat complex techniques. Thus, for example, in U.S. Pat. No. 3,711,482 2-acetyl-3-ethyl pyrazine is shown to be produced by the reaction of a 2,3-diethyl pyrazine with an N - halosuccinimide to form a 2-(1-haloethyl)-3-ethyl pyrazine and then treating the halogenated derivative with an alkali metal and 2-nitropane. It is indicated in U.S. Pat. No. 3,711,482 that it is desirable to have a catalyst present during the first step of this reaction, that catalyst being a strong oxidizing agent, for example, a peroxide such as benzoylperoxide, acetylperoxide and the like or, in the alternative, it is indicated that it is desirable to use ultraviolet light. At column 3, lines 14 et seq. another process for producing 2-acetyl-3-ethyl pyrazine is set forth. In this case, 2-acetyl-3-ethyl pyrazine is produced by starting with 2,3 diethyl pyrazine and treating it with an oxidizing agent to produce the 2,3 diethyl pyrazine N-oxide; then treating the N-oxide with acetic anhydride to produce the 2(1-acetopyalkyl)-3-alkyl derivative; then hydrolyzing the acetoxy material with a strong base to produce the corresponding alcohol, 2(1-hydroxyalkyl)-3-alkypyrazine and, finally, oxidizing this alcohol to form the corresponding ketone, namely, 2-acetyl-3-ethyl pyrazine. Acetyl pyrazine per se is disclosed to be prepared by reaction of methyl magnesium bromide with 2-cyano pyrazine in U.S. Pat. No. 3,402,051. The 2-cyano pyrazine in turn is prepared from pyrazinamide by means of dehydration thereof. The aforecited methods for preparing 2-acyl-3-alkyl pyrazines are considered to give rise to low yields and are considered to be inefficient, costly and cumbersome particularly where it is desired to scale up the process for the purpose of commercial manufacture.

It is therefore an object of the present invention to provide a novel process for the preparation of 2-acyl-3-lower alkyl pyrazines and mixtures of same.

It is a further object of the present invention to provide a process for the preparation of 2-acetyl-3-ethyl pyrazines from 2,3 diethyl pyrazines.

It is a still further object of the present invention to provide a novel one step process to produce 2-acyl-3-lower alkyl pyrazines from 2-lower alkyl-3-lower alkyl pyrazines.

Other objects of the present invention will be set forth in, or be readily apparent, from the detailed description of this invention, infra.

The oxidation of alkyl pyrazines with acid dichromate has not been reported. Attempts to oxidize alkyl pyrazines, for example, 2-methyl pyridine, 4-methyl pyridine, 2,4-dimethyl pyridine and 1-α-pyridyl-2-propanol with chromic acid proceeded violently and led to destruction of the molecules as set forth in Mariot and Pulland, Compt. Rend., 248,252-4 (1959). However, chromic acid has been used to oxidize 2-phenyl-5-benzyl) pyridine to benzoyl pyridine. See Benary and Psille, Ber. 57,828 (1924).

THE INVENTION

The aforesaid objects are achieved by the process of the present invention which comprises the single reaction step of admixing a 2-ethyl-3-lower alkyl pyrazine or 2-propyl-3-lower alkyl pyrazine having the generic structure:

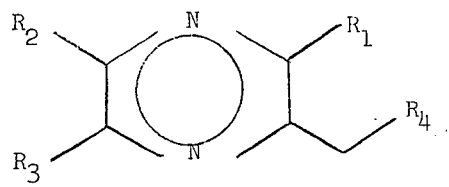

with (i) an alkali metal dichromate and (ii) a lower alkanoic acid or sulfuric acid. The product obtained by this one step reaction is a 2-acyl-3-lower alkyl pyrazine having the generic structure:

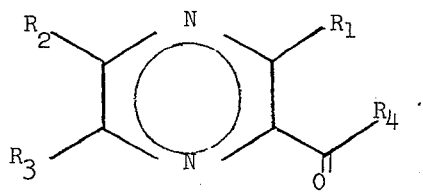

wherein $R_1$ is lower alkyl; $R_2$ and $R_3$ are each the same or different and are selected from the group consisting of hydrogen and lower alkyl and $R_4$ is methyl or ethyl. Examples of different 2-lower alkyl-3-lower alkyl pyrazines which can be used as reactants are as follows:

2,3-diethyl pyrazine
2-ethyl-3-methyl pyrazine
1-ethyl-3,5-dimethyl pyrazine
2-ethyl-3,6-dimethyl pyrazine
2ethyl-3-methyl-5-probyl pyrazine
2,5-dipropyl-3-methyl pyrazine
2,3-diethyl-5,6-dimethyl pyrazine
2,3-dipropyl-5,6-dimethyl pyrazine
2-ethyl-3-methyl pyrazine The reaction is carried out by first admixing the alkali metal dichromate with either a lower alkanoic acid or sulfuric acid. The lower alkanoic acid which can be used is most conveniently glacial acetic acid or propionic acid. Where sulfuric acid is desired to be used, it should be "dilute" aqueous sulfuric acid having a concentration of approximately 50 percent.

The 2,3-dilower alkyl pyrazine (or mixture of pyrazines) is then admixed with the mixture of the alkali metal dichromate and the acid (either the lower alkanoic acid or the dilute sulfuric acid). The order of addition is not critical. However, it is most preferred to add the mixture of alkali metal dichromate (e.g. sodium dichromate) and acid to the 2,3-dilower alkyl pyrazine (or mixture of pyrazines).

The temperature of the reaction may vary between about 25° and 160°C. However, if the reaction is run at room temperature, approximately 25° up to 80°C longer reaction periods are needed. The higher the temperature of the reaction mass the lower the time of reaction required to produce commercially feasible yields of product. Accordingly, in order to cause this process to be efficient it is most preferred to operate the reaction at temperatures of the order of 80° up to 130°C. Most preferable is operation of the reaction at reflux temperatures and this is a function of the ingredients of the reaction vessel, e.g., the nature of the 2,3-dilower alkyl pyrazine reactant, and the amount of lower alkanoic or dilute sulfuric acid used; as well as the ratio of the alkali metal dichromate to the acid used. Thus, for example, the reaction is most conveniently run at reflux conditions at 118°C for a period of 4 hours where:

a. The pyrazine to be oxidized is 2,3-diethyl pyrazine;
b. The alkali metal dichromate used is sodium dichromate;
c. The lower alkanoic acid used is glacial acetic acid;
d. The sodium dichromate-glacial acetic acid solution is added dropwise to preheated 2,3-dimethyl pyrazine.
e. The weight ratio of sodium dichromate to acetic acid is 1:2; and
f. The sodium dichromate — glacial acetic acid mixture is preheated to 40°C before adding the 2,3-diethyl pyrazine thereto.

The overall yield of 2-acyl-3-lower alkyl pyrazine resulting from the instant process is a function of the following process variables:

1. The nature of the 2,3-dilower alkyl pyrazine used;
2. The temperature of the reaction mass;
3. The time of the reaction;
4. The nature of the oxidizing agent used (concentration of dichromate in acid and nature of acid);
5. The ratio of dilower alkyl pyrazine to dichromate-acid oxidizing agent; and
6. The order of addition of ingredients (that is whether the acid dichromate mixture is added to the 2,3-dialkyl pyrazine or whether the 2,3-dialkyl pyrazine is added to the acid-dichromate mixture).

More preferably, the weight ratio of the 2,3-dilower alkyl pyrazine to alkali metal dichromate is 1:1.5 and the weight ratio of alkali metal dichromate to acid is 1:2. Where dilute sulfuric acid is used in place of the lower alkanoic acid, the yield is diminished somewhat. The yield is not increased when the concentration of sodium dichromate is increased beyond that which is set forth above. Indeed, too much alkali metal dichromate will decrease the yield due to other side products being formed. If all reactants are mixed at room temperature and then heated to reflux, reaction time will be reduced and secondary oxidation products will be diminished and the yield of desired product will be thusly increased. If the concentration of alkali metal dichromate to acetic acid is increased, the yield is also, correspondingly, will be increased. The yield is decreased somewhat where the 2,3-dilower alkyl pyrazine is added to the oxidizing solution rather than where the oxidizing solution is added to the 2,3-dilower alkyl pyrazine.

The nature of the starting material is critical insofar as yield is concerned also. Thus, for example, 2-ethyl-3,5-dimethyl pyrazine and 2-ethyl-3,6-dimethyl pyrazine in admixture will not give rise to as much 2-acyl-3-lower alkyl pyrazine as is the case when merely using as a starting reactant 2,3-diethyl pyrazine. It is noteworthy that 2-ethyl-5-methyl pyrazine and 2-ethyl pyrazine reactants will yield insignificant amounts of 2-acyl pyrazines according to this process, and, as a result, the use of these reactants is not deemed to fall within the contemplated scope of my invention.

It is also significant that where the reaction involving as a reactant 2-ethyl-3,5-dimethyl pyrazine is carried out, a temperature of 80°C will cause the yield to double that of the yield achieved when a reaction temperature of 116°C is used.

The instant reaction appears to be specific to pyrazine nuclei. That is, when the reaction of our invention is attempted to be carried out on similar compounds except that the nuclei are pyridine nuclei, very low yields of oxidation product are obtained. (For example, where 4-ethyl-3-methyl pyridine is oxidized to 4-acetyl-3-methyl pyridine using the reaction conditions of the instant process a 5 percent is obtained).

The following examples will illustrate in detail the manner in which the invention may be practiced. It will be understood, however, that the invention is not confined to the specif limitations set forth in the individual examples but rather to the scope of the appended claims.

EXAMPLE I

PREPARATION OF 2-ACETYL-3-METHYL PYRAZINE

Into a 500 cc reaction vessel equipped with stirrer, thermometer, and dropping funnel is placed 19.0 grams of 2-ethyl-3-methyl pyrazine. The 2-ethyl-3-methyl pyrazine is heated to 80°C and, at 80°C, with stirring, a solution of 90 grams of sodium bichromate ($Na_2Cr_2O_7 \cdot 2H_2O$) in 180 grams of acetic acid is added. The addition takes place over a period of 3½ hours after which the reaction mass is cooled. (Ratio of starting material to product equals 1:1). 721 ml of water is then added to the reaction mass and the reaction mixture is extracted with methylene chloride. The organic phase is then distilled after adding 2 grams of Primol and Ionol thereto. The distillation is carried out at a vapor temperature of 69°C at 10 mm. Hg. pressure (Yield 21.1 grams 2-acetyl-3-methyl pyrazine as determined by GLC, NMR and mass spectral analysis). (Distillation carried out on a 3 inch micro-vigreux column).

EXAMPLE II

Into a 5 liter 3-necked flask equipped with heating mantle, stirrer, and reflux condenser the following materials are placed:

| | |
|---|---|
| Acetic acid | 3000 g |
| Sodium dichromate | 1500 g |

The acetic acid disodium dichromate mixture is heated to 40°C with stirring until no solid exists in the solution.

Into a 12 liter flask equipped with heating mantle, stirrer, reflux condenser, dropping funnel and thermometer is placed 1,088 g of 2,3 diethyl pyrazine. The 2,3 diethyl pyrazine is heated to 118°C and, dropwise with stirring, while maintaining the temperature of 118°C over a 3 hour period, the sodium dichromate-acetic acid solution prepared in the 5 liter reaction flask is added to the diethyl pyrazine. The reaction mass is maintained at reflux for 1 additional hour after addition of the sodium dichromate-acetic acid solution.

The reaction mass is then quenched by pouring same into 12 liters of water. The water-reaction mass mixture is then extracted 4 times with 1,000 g of toluene per extraction. The toluene extracts are combined and the water phases are discarded. The toluene extracts are then washed once with 5 liters of water and the water layer is discarded. The toluene extracts are then washed with 1,500 g of a 5 percent sodium carbonate solution until they are neutral. (pH=7).

50 g of Primol 355 and 2.5 g of Ionol C.P. are then added to the crude oil. The toluene is recovered continuously at 80 mm. Hg. pressure to a vapor temperature of 46°C and a liquid temperature of 100°C. The reaction mass is then fractionated at a vapor temperature of 77°C and a pressure of 6.0 mm Hg. (reflux ratio, 9:1). Yield: 61.5 percent of theory. Resulting product having a refractive index of 1.5142 and a water white color was determined by NMR, mass and spectral analysis, analysis to be 2-acetyl-3-ethyl pyrazine.

This material has a green floral, slightly nutty note which seems to lend enhancement to Petitgrain Absolute and gives it a more intense floral note and strength and also gives it an "unrectified oil" note.

EXAMPLE III

PREPARATION OF ACETYL PYRAZINE

Into a 250 ml reaction flask equipped with heating mantle, stirrer, thermometer, and dropping funnel, 17.28 g of ethyl pyrazine is added. The ethyl pyrazine is heated to 115°C and while being maintained at this temperature, over a period of 1½ hours, a solution of sodium dichromate (0.1 moles) in 60 grams of acetic acid is added. After the addition is complete, the reaction mass is stirred for a period of 30 minutes whereupon 240 ml of water saturated with sodium chloride is added thereto. The resulting mass is then extracted with 100 ml of diethyl ether. The ether extracts are washed with 100 ml portions of saturated sodium carbonate solutions. After drying over anhydrous sodium sulfate the diethyl ether is recovered at 150 mm. Hg. pressure and 20°C. 1 gm. of Primol and 1 gm. of Ionol are then added to the crude product which is then distilled at a vapor temperature of 59°C and a pressure of 33 mm. Hg. GLC and NMR analysis yield the information that the product is acetyl pyrazine. (Yield: 1.6 percent).

EXAMPLE IV

PREPARATION OF 2-ACETYL-5-METHYL PYRAZINE

Into a 250 ml reaction flask equipped with stirrer, reflux condenser, thermometer and heating mantle 19.5 grams (0.16 moles) of 2-ethyl-5-methyl pyrazine is placed. 30 Grams of sodium dichromate in 60 grams of acetic acid is then added to the solution with stirring. At that point, the reaction mass is heated to 80°C and maintained at that temperature for a period of 48 hours. At the end of this period, another solution of 60 grams of sodium dichromate in 120 grams of acetic acid is added and the reaction mass is maintained at 80°C for another period of 12 hours. The reaction mass is then quenched on 720 ml of water and extracted with six 50 ml portions of dichloromethane. Solvent is then stripped and the product is distilled at a vapor temperature of 7901–81°C, at a 8 mm. Hg. pressure. (Yield: 8.8 percent). GLC and NMR analysis confirm the product as being 2-acetyl-5-methyl pyrazine.

EXAMPLE V

Into a first one liter 3-necked flask equipped with heating mantle, stirrer, and reflux condenser the following materials are placed:

| | |
|---|---|
| Acetic acid | 650 g |
| Sodium dichromate | 135 g |

The acetic acid disodium dichromate mixture is heated to 40°C with stirring until no solid exists in the solution.

Into a second 1 liter flask equipped with heating mantle, stirrer, reflux condenser, dropping funnel and thermometer is placed 32.6 g of 2,3 diethyl pyrazine. The 2,3 diethyl pyrazine is heated to 80°C and, dropwise with stirring, while maintaining the temperature at 80°C over a 3 hour period, the sodium dichromate-acetic acid solution prepared in the first 1 liter reaction flask is added to the diethyl pyrazine. The reaction mass is maintained at 80°C for 1 additional hour after addition of the sodium dichromate-acetic acid solution.

The reaction mass is then quenched by pouring same into 1 liter of water. The water-reaction mass mixture is then extracted 4 times with 100 g of toluene per extraction. The toluene extracts are combined and the water phases are discarded. The toluene extracts are then washed once with 500 cc of water and the water layer is discarded. The toluene extracts are then washed with 150 g of a 5 percent sodium carbonate solution until they are neutral.

2 g of Primol 355 and 1 g of Ionol C.P. are then added to the crude oil. The toluene is recovered continuously at 80 mm. Hg. pressure to a vapor temperature of 46°C and a liquid temperature of 100°C. The reaction mass is then fractionated at a vapor temperature of 77°C and a pressure of 6.0 mm Hg. Yield: 30.8 percent of theory. The resulting product having a refractive index of 1.5142 and a water white color was determined by NMR and mass spectral analysis, analysis to be 2-acetyl-3-ethyl pyrazine.

This material has a green, floral, slightly nutty note which seems to lend enhancement to Petitgrain Absolute and gives it a more intense floral note and strength and also gives it an unrectified oil note.

EXAMPLE VI

Into a first 1 liter 3-necked flask equipped with heating mantle, stirrer, and reflux condenser the following materials are placed:

| | |
|---|---|
| Acetic acid | 650 g |
| Sodium dichromate | 135 g |

The acetic acid disodium dichromate mixture is heated to 40°C with stirring until no solid exists in the solution.

Into a second 1 liter flask equipped with heating mantle, stirrer, reflux condenser, dropping funnel and thermometer is placed 32.6 g of 2,3 diethyl pyrazine. The 2,3 diethyl pyrazine is heated to 118°C and dropwise with stirring while maintaining the temperature at 118°C over a 3 hour period the sodium dichromate-acetic acid solution prepared in the first 1 liter reaction flask is added to the diethyl pyrazine. The reaction mass is maintained at reflux for 1 additional hour after addition of the sodium dichromate-acetic acid solution.

The reaction mass is then quenched by pouring same into one liter of water. The water-reaction mass mixture is then extracted 4 times with 100 g of toluene per extraction. The toluene extracts are combined and the water phases are discarded. The toluene extracts are then washed once with 300 cc of water and the water layer is discarded. The toluene extracts are then washed with 150 g of a 5 percent sodium carbonate solution until they are nuetral.

2 g of Primol 355 and 1.0 g of Ionol C.P. are then added to the crude oil. The toluene is recovered continuously at 80 mm. Hg. pressure to a vapor temperature of 46°C and a liquid temperature of 100°C. The reaction mass is then fractionated at a vapor temperature of 77°C and a pressure of 6.0 mm. Hg. Yield: 40.8 percent of theory. resulting product having a refractive index of 1.5142 and a water white color was determined by NMR and mass spectral analysis, analysis to be 2-acetyl-3-ethyl pyrazine.

This material has a green, floral, slightly nutty note which seems to lend enhancement to Petitgrain Absolute and gives it a more intense floral note and strength and also gives it an unrectified oil note.

EXAMPLE VII

Into a first 1 liter 3-necked flask equipped with heating mantle, stirrer, and reflux condenser the following materials are placed:

| | |
|---|---|
| Acetic acid | 650 g |
| Sodium dichromate | 45 g |

The acetic acid-sodium dichromate mixture is heated to 40°C with stirring until no solid exists in the solution.

Into a second 1 liter flask equipped with heating mantle, stirrer, reflux condenser, dropping funnel and thermometer is placed 32.6 g of 2,3 diethyl pyrazine. The 2,3 diethyl pyrazine is heated to 118°C and dropwise with stirring while maintaining the temperature at 118°C over a 3 hour period the sodium dichromate-acetic acid solution prepared in the first one liter reaction flask is added to the diethyl pyrazine. The reaction mass is maintianed at reflux for 1 additional hour after addition of the sodium dichromate-acetic acid solution.

The reaction mass is then quenched by pouring same into 1 liter of water. The water-reaction mass mixture is then extracted 4 times with 100 g of toluene per extraction. The toluene extracts are combined annd the water phases are discarded. The toluene extracts are then washed once with 500 cc of water and the water layer is discarded. The toluene extracts are then washed with 150 g of a 5 percent sodium carbonate solution until they are neutral.

2 g of Primol 355 and 1.0 g of Ionol C.P. are then added to the crude oil. The toluene is recovered continuously at 80 mm. Hg. pressure to a vapor temperature of 46°C and a liquid temperature of 100°C. The reaction mass is then fractionated at a vapor temperature of 77°C and a pressure of 6.0 mm. Hg. Yield: 35 percent of theory. The resulting product having a refractive index of 1.5142 and a water white color was determined by NMR and mass spectral analysis, analysis to be 2-acetyl-3-ethyl pyrazine.

This material has a green, floral, slightly nutt;y note which seems to lend enhancement to Petitgrain Absolute and give it a more intense floral note and strength and also give it an unrectified oil note.

EXAMPLE VIII

Into a 5 liter 3-necked flask equipped with heating mantle, stirrer, and reflux condenser the following materials are placed:

| | |
|---|---|
| Sulfuric acid (50% aqueous) | 3000 g |
| Sodium dichromate | 1500 g |

The sulfuric acid disodium dichromate mixture is heated to 40°C with stirring until no solid exists in the solution.

Into a 12 liter flask equipped with heating mantle, stirrer, reflux condenser, dropping funnel and thermometer is placed 1,088 g of 2,3 diethyl pyrazine. The 2,3 diethyl pyrazine is heated to 118°C and dropwise with stirring while maintaining the temperature at 118°C over a 3 hour period the sodium dichromate-sulfuric acid solution prepared in the 5 liter reaction flask is added to the diethyl pyrazine. The reaction mass is maintained at reflux for 1 additional hour after addition of the sodium dichromate-sulfuric acid solution.

The reaction mass is then quenched by pouring same into 12 liters of water. The water-reaction mass mixture is then extracted 4 times with 1,000 g of toluene per extraction. The toluene extracts are combined and the water phases are discarded. The toluene extracts are then washed once with 5 liters of water and the water layer is discarded. The toluene extracts are then washed with 1,500 g of a 5 percent sodium carbonate solution until they are neutral. (pH=7).

50 g of Primol 355 and 2.5 g of Ionol C.P. are then added to the crude oil. The toluene is recovered continuously at 80 mm. Hg. pressure to a vapor temperature of 46°C and a liquid temperature of 100°C. The reaction mass is then fractionated at a vapor temperature of 77°C and a pressure of 6.0 mm. Hg. Yield: 27.2 percent of theory. The resulting product having a refractive index of 1.5142 and a water white color was determined by NMR and mass spectral analysis, analysis, to be 2-acetyl-3-ethyl pyrazine.

This material has a green, floral, slightly nutty note which seems to lend enhancement to Petitgrain Absolute and give it a more intense floral note and strength and also give it an unrectified oil note.

EXAMPLE IX

Into a 12 liter 3-necked reaction flask equipped with heating mantle, stirrer, reflux condenser, dropping funnel and thermometer, the following ingredients are added:

| | |
|---|---|
| Acetic acid | 3000 g |
| Sodium dichromate | 1500 g |

The acetic acid-sodium dichromate mixture is then heated to 40°C with stirring until no solid remains in the solution. Through the dropping funnel 1,088 g of 2,3 diethyl pyrazine is added dropwise over a period of 3 hours while maintaining the temperature of the reaction mass at 118°C. The reaction mass is continued to be refluxed for 1 additional hour after which the mass is cooled to room temperature.

The reaction mass is then quenched by pouring it into to 12 liters water. The water-reaction mass mixture is then extracted 4 times with 100 g of toluene per extraction. The toluene extracts are combined and the water phases are discarded. The toluene extracts are then washed once with 5 liters of water and the water layer is discarded. The toluene extracts are then washed withh 1,500 g of a 5 percent sodium carbonate solution until they are neutral. (pH=7).

50 g of Primol 355 and 2.5 g of Ionol C.P. are then added to the crude oil. The toluene is recovered continuously at 80 mm. Hg. pressure to a vapor temperature of 46°C and a liquid temperature of 100°C. The reaction mass is then fractionated at a vapor temperature of 77°C and a pressure of 6.0 mm Hg. Yield: 56.5 percent of theory. The resulting product, having a refractive index of 1.5142 and a water white color, was determined by NMR, and mass spectral analysis, and IR analysis to be 2-acetyle-3-ethyl pyrazine.

This material has a green, floral, slightly nutty note which seems to lend enhancement to Petitgrain Absolute and give it a more intense floral note and strength and also give it an unrectified oil note.

EXAMPLE X

PREPARATION OF 2-acetyl-3,5 DIMETHYL PYRAZINE AND 2-ACETYL-3,6 DIMETHYL PYRAZINE (MIXTURE)

Into a 300 cc reaction vessel equipped with stirrer, thermometer, and dropping funnel is placed 0.16 moles of 2-ethyl-3,5 dimethyl pyrazine in admixture with 2-ethyl-ethyl-3,6 dimethyl pyrazine. The pyrazine mixture is heated to 80°C and, at 80°C, with stirring a solution of 0.1 moles of sodium dichromate in 60 g of acetic acid is added. The addition takes place over a period of 3.5 hours after which the reaction mass is cooled to room temperature. 600 ml of water is then added to the reaction mass and the reaction mixture is extracted with methylene chloride. The organic phase is then distilled after adding 2 g of Primol and Ionol thereto. The distillation is carried out at a vapor temperature of 72°Cat 2 mm Hg pressure (Yield: 50.0 percent). The compounds contained in the reaction mass are confirmed to be 2-acetyl-3,5 dimethyl pyrazine and 2-acetyle-3,6 dimethyl pyrazine in a 50:50 mole ratio by GLC, NMR and mass spectral analysis.

EXAMPLE XI

PREPARATION OF 2-ACETYL-3,5 DIMETHYL PYRAZINE AND 2-2-ACETYL-3,6 DIEMTHYL PYRAZINE (MIXTURE)

Into a 300 cc reaction vessel equipped with stirrer, thermometer, and dropping funnel is placed 0.16 moles of 2-ethyl-3,5 dimethyl pyrazine in admixture with 2-ethyl-3,6 dimethyl pyrazine. The pyrazine mixture is heated to 116°C and, at 116°C, with stirring a solution of 0.1 moles of sodium dichromate in 60 g of acetic acid is added. The addition takes place over a period of 3.5 hours after which the reaction mass is cooled to room temperature. 600 ml of water is then added to the reaction mass and the reaction mixture is extracted with methylene chloride. The organic phase is then distilled after adding 2 g of Primol and Ionol thereto. The distillation is carried out at a vapor temperature of 72° at 2 mm Hg. pressure (Yield: 24.5 percent). The compounds contained in the reaction mass are confirmed to be 2acetyl-3,5 dimethyl pyrazine and 2-acetyl-3,6 dimethyl pyrazine in a 50:50 mole ratio by GLC, NMR and mass spectral analysis.

EXAMPLE XII

PREPARATION OF 2-ACETYL-3,5 DIMETHYL PYRAZINE AND 2-ACETYL-3,6 DIMETHYL PYRAZINE (MIXTURE)

Into a 300 cc reaction vessel equipped with stirrer, thermometer, and dropping funnel is placed 0.16 moles of 2-ethyl-3,5 dimethyl pyrazine in admixture with 2-ethyl-3,6 dimethyl pyrazine. The pyrazine mixture is heated to 80°C and, at 80°C, with stirring a solution of 0.3 moles of sodium dichromate in 180 cc of acetic acid is added. The addition takes place over a period of 3.5 hours after which the reaction mass is cooled to room temperature. 600 ml of water is then added to the reaction mass and the reaction mixture is extracted with methylene chloride. The organic phase is then distilled after adding 2 g of Primol and Ionol thereto. The distillation is carried out at a vapor temperature of 72° at 2 mm Hg. pressure (Yield: 36.4 percent). The compounds contained in the reaction mass are confirmed to be 2-acetyl-3,5 dimethyl pyrazine and 2-acetyl-3,6 dimethyl pyrazine in a 50:50 mole ratio by GLC, NMR and mass spectral analysis.

What is claimed is:

1. A process for producing a 2-alkanoyl-3-straight chain lower alkyl pyrazine having the structure:

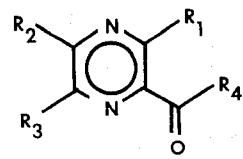

wherein $R_1$ is $C_1$–$C_3$ straight chain lower alkyl; $R_2$ and $R_3$ are each the same or different and each is selected from the group consisting of hydrogen and methyl; and $R_4$ is selected from the group consisting of ethyl and methyl comprising the steps of:

a. Intimately admixing a compound having the structure:

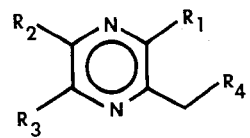

with (1) an alkali metal dichromate and (2) a $C_2$–$C_3$ straight chain alkanoic acid;

b. Heating the resulting mixture at a temperature in the range of from 80° up to 160°C; and c. Recovering the 2-alkanoyl-3-straight chain lower alkyl pyrazine therefrom.

2. A process for producing a 2-alkanoyl-3-straight chain lower alkyl pyrazine having the structure:

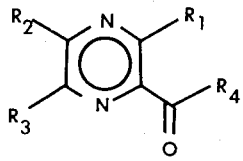

wherein $R_1$ is $C_1$–$C_3$ straight chain lower alkyl; $R_2$ and $R_3$ are each the same or different and are each selected from the group consisting of hydrogen and methyl; and $R_4$ is selected from the group consisting of ethyl and methyl comprising the steps of:

a. Intimately admixing a compound having the structure:

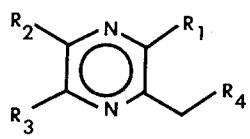

with (1) a material selected from the group consisting of a $C_2$–$C_3$ straight chain alkanoic acid and approximately 50 percent aqueous sulfuric acid; and (2) and alkali metal dichromate;

b. Heating the resulting mixture at a temperature in the range of from 80° up to 160°C; and c. Recovering the 2-alkanoyl-3-straight chain lower alkyl pyrazine therefrom.

3. The process of claim 1 wherein $R_1$ is ethyl, $R_2$ is hydrogen, $R_3$ is hydrogen and $R_4$ is methyl.

4. The process of claim 1 wherein the alkali metal dichromate is sodium dichromate and the alkanoic acid is acetic acid.

5. the process of claim 1 wherein the resulting mixture is heated at 118°C.

6. The process of claim 1 wherein the resulting mixture is heated at 118°C and the resulting reaction product is distilled.

7. A process for producing 2-acetyl-3-ethyl pyrazine comprising the steps of:

a. Intimately admixing 2,3 diethyl pyrazine with a mixture of sodium dichromate and acetic acid;

b. heating the resulting mixture at a temperature of 118°C for a period in the range of from 2 hours up to 5 hours; and c. recovering the 2-acyl pyrazine therefrom.

8. The process of claim 7 wherein time period for heating the reaction mixture is 4 hours.

* * * * *